US007971480B2

(12) United States Patent
Smirnov et al.

(10) Patent No.: US 7,971,480 B2
(45) Date of Patent: Jul. 5, 2011

(54) MASS FLOW CONTROLLER HAVING A FIRST PAIR OF THERMAL SENSING ELEMENTS OPPOSING A SECOND PAIR OF THERMAL SENSING ELEMENTS

(75) Inventors: Alexei V. Smirnov, Fort Collins, CO (US); R. Mike McDonald, Fort Collins, CO (US); Justin Mauck, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 174 days.

(21) Appl. No.: 12/250,205

(22) Filed: Oct. 13, 2008

(65) Prior Publication Data

US 2010/0089459 A1    Apr. 15, 2010

(51) Int. Cl.
*G01F 1/68* (2006.01)

(52) U.S. Cl. .................................. 73/204.23; 73/202.5

(58) Field of Classification Search .................. None
See application file for complete search history.

(56) References Cited

U.S. PATENT DOCUMENTS

| | | | | |
|---|---|---|---|---|
| 4,658,855 A | * | 4/1987 | Doyle | 137/468 |
| 4,672,997 A | * | 6/1987 | Landis et al. | 73/202.5 |
| 4,972,707 A | | 11/1990 | Nijdam | |
| 5,279,154 A | * | 1/1994 | Vavra et al. | 73/202.5 |
| 6,318,171 B1 | | 11/2001 | Suzuki | |
| 6,446,504 B1 | * | 9/2002 | Maginnis, Jr. | 73/204.27 |
| 6,883,370 B2 | * | 4/2005 | Vincze et al. | 73/204.26 |
| 7,021,136 B2 | * | 4/2006 | Vincze et al. | 73/204.26 |
| 2003/0115951 A1 | | 6/2003 | Ambrosia et al. | |
| 2008/0196494 A1 | | 8/2008 | Suzuki | |

FOREIGN PATENT DOCUMENTS

| | | |
|---|---|---|
| EP | 0395126 | 10/1990 |
| EP | 1867962 B1 | 12/2007 |
| JP | 07-027582 A1 | 1/1995 |
| JP | 11-160120 A1 | 6/1999 |

OTHER PUBLICATIONS

Clark, Stephen, "International Search Report re Application No. PCT/US09/060415", Dec. 7, 2009, Published in: PCT.

* cited by examiner

*Primary Examiner* — Harshad Patel
(74) *Attorney, Agent, or Firm* — Neugeboren O'Dowd PC; Sean R. O'Dowd

(57) ABSTRACT

One embodiment of the present invention involves a thermal sensor and a method of using the same. One thermal sensor is adapted to output a signal which is unaffected by external longitudinal and orthogonal thermal gradients. In one embodiment, the mass flow controller thermal sensor comprises a capillary tube having an upstream tube portion, a tube bend portion, and a downstream tube portion, the downstream portion being substantially parallel to the upstream portion. A distance between the upstream tube portion and the downstream tube portion in one embodiment is no greater than half the upstream portion and downstream portion lengths, a first pair of thermal sensing elements are coupled to the upstream tube portion and a second pair of thermal sensing elements are coupled to the downstream tube portion.

11 Claims, 7 Drawing Sheets

MASS FLOW CONTROLLER HAVING A FIRST PAIR OF THERMAL SENSING ELEMENTS OPPOSING A SECOND PAIR OF THERMAL SENSING ELEMENTS

FIELD OF THE INVENTION

The present invention generally relates to mass flow controllers. In particular, but not by way of limitation, the present invention relates to mass flow controller thermal sensors and methods for operating the same.

BACKGROUND OF THE INVENTION

A typical mass flow controller (MFC) is a device configured and adapted to control the delivery of a fluid. A specified delivery rate of fluid may be set by a user in terms of, for example, cubic centimeters or grams of fluid delivered from the MFC per minute. In order to control the flow rate of fluid delivered from the MFC, a typical MFC generates an output signal which is indicative of the actual flow rate of the MFC. This actual flow rate is compared to the user-specified flow rate and a control valve is adjusted, if necessary, to modify the flow so that the flow of the fluid released from the MFC is released at the specified delivery rate.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention provide for mass-flow-controller-related devices and methods for operating the same. One embodiment for example, comprises a mass flow controller thermal sensor. The thermal sensor comprises a capillary tube, a first pair of sensing elements, and a second pair of sensing elements. One capillary tube is coupled to a main fluid flow line across a mass flow controller bypass. The first pair of sensing elements is coupled to an upstream portion of the capillary tube and the second pair of sensing elements is coupled to a downstream portion of the capillary tube, wherein the second pair of sensing elements generally opposes the first pair. Furthermore, the upstream portion and downstream portion are generally parallel in one embodiment, with the distance between the two portions being no greater than half the length of the two portions.

Another illustrative embodiment of the invention is a method of operating a mass flow controller thermal sensor. In one method, a fluid is received in a first direction across at least one thermal sensing element. Fluid is also received in a second direction across a second thermal sensing element. Longitudinal and orthogonal temperature gradients are then induced across the first and second sensing elements from an external thermal source and a mass flow rate signal is output from the thermal sensor. The output is not affected by the longitudinal and orthogonal thermal gradients.

Other embodiments of the invention comprise a mass flow controller. In one embodiment, the mass flow controller comprises a main flow line, a thermal sensor, and a differential amplifier. The thermal sensor comprises a u-shaped capillary tube coupled to the main flow line and at least one sensing element coupled to the tube. The at least one thermal sensing elements is adapted to output a signal having a voltage generally proportional to the temperature of the element. The differential amplifier is adapted to (i) receive the at least one thermal sensing element output signal, and (ii) output a differential amplifier signal, the differential simplifier signal comprising a voltage generally proportional to the flow rate of the fluid flowing through the mass flow controller. Furthermore, the voltage output by the differential amplifier is not affected by orthogonal and longitudinal temperature gradients.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
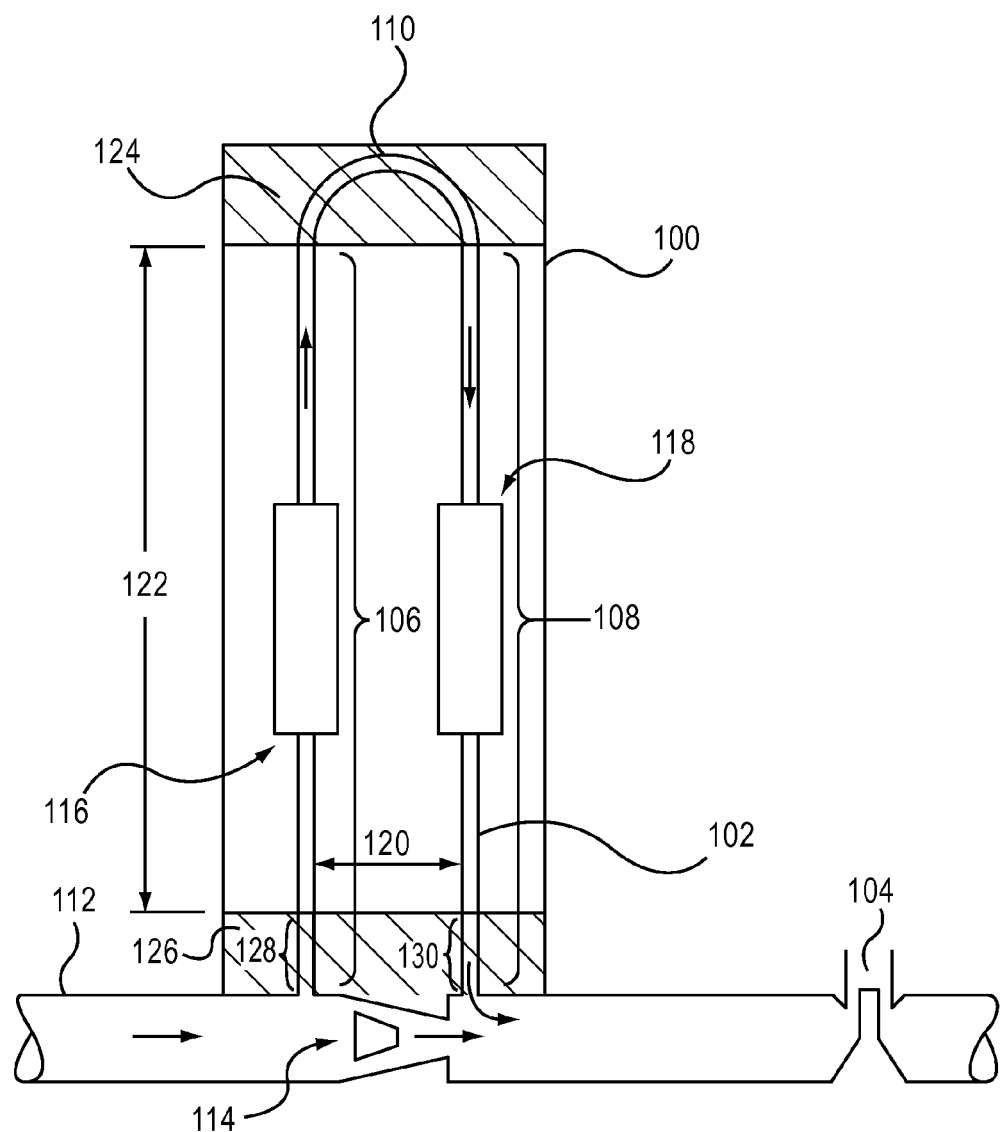
FIG. 1 is a partial view of a mass flow controller including a thermal sensor coupled to a main flow line in accordance with an illustrative embodiment of the invention.

Referring now to the drawings, where like or similar elements are designated with identical reference numerals throughout the several views where appropriate, and referring in particular to FIG. 1, shown is a mass flow controller thermal sensor 100 in accordance with an illustrative embodiment of the invention. One embodiment of the thermal sensor 100 comprises a capillary tube 102 and one or more thermal sensing elements 116, 118. One embodiment may be comprised of an upstream thermal sensing element 116 and a downstream thermal sensing element 118. Furthermore, the capillary tube 102 may have an upstream portion 106, a downstream portion 108 and a tube bend portion 110.

In one embodiment, as a fluid flows through a mass flow controller (MFC), the fluid flows through a main flow line 112 towards a bypass 114. Prior to entering the bypass 114, a portion of the fluid enters the capillary tube 102. In one embodiment, the fluid in the capillary tube 102 flows through the upstream tube portion 106 in a first direction, to the tube bend portion 110, through the downstream tube portion 108 in a second direction generally opposing the first direction, and back into the main flow line 112, re-entering the main flow line 112 downstream of the bypass 114.

One or more variations of thermal sensor 100 are adapted to output one or more signals (not shown in FIG. 1) used to determine the flow rate of the fluid flowing through the mass flow controller. To determine a fluid flow rate, an output voltage from one or more upstream sensing elements 116 is compared to an output voltage from one or more downstream sensing elements 118. As the temperature of the elements 116, 118 fluctuates, so do the output voltages. Therefore, as the fluid through the capillary tube 102 carries heat from the upstream sensing element 116 to the downstream sensing element 118, different voltages are produced by the elements 116, 118. Based on the voltage difference between the sensors 116, 118, the flow rate of fluid through the MFC may be obtained. This fluid flow rate output by the thermal sensor 100 may then be used to adjust a control valve 104 to increase or decrease the actual fluid flow rate so the actual fluid flow rate equals a predetermined fluid flow rate set by a user.

Figure 6A:
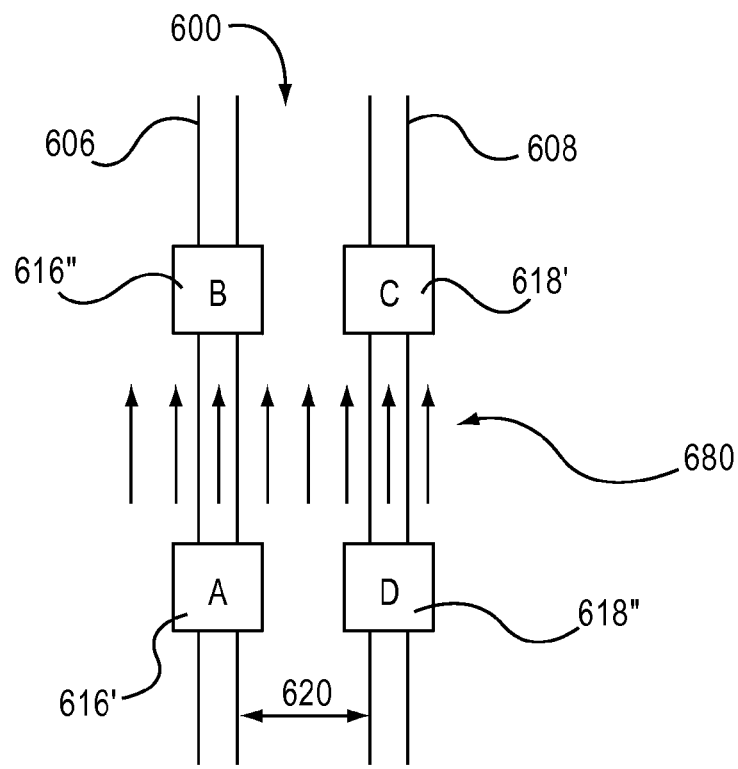
FIGS. 6A and 6B are schematic representations of respective (i) portions of a mass flow controller thermal sensor, and (ii) thermal temperature gradients, according to one embodiment of the invention.
Figure 6B:
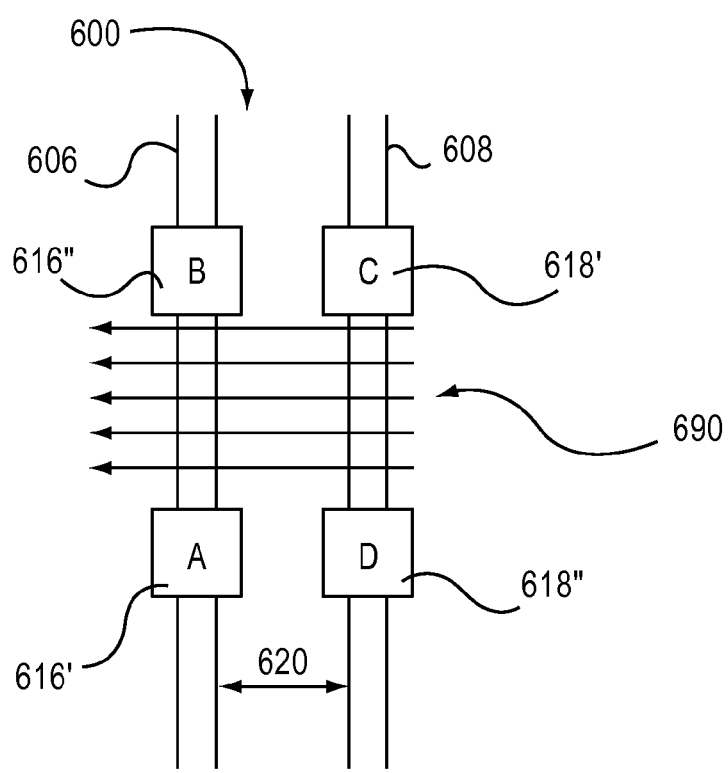

As the flow rate of fluid measured by the thermal sensor 100 is dependent upon the change in temperature of the thermal sensing elements 116, 118, any external thermal source may affect the voltage level output by the sensing elements 116, 118. Therefore, external thermal sources may cause the mass flow controller thermal sensor 100 to output an incorrect fluid flow rate. External thermal sources produce temperature gradients which are comprised of longitudinal gradients 680 and orthogonal gradients 690, as shown in FIGS. 6A and 6B. Longitudinal gradients 680 comprise a temperature gradient portion which is parallel to the fluid flow in the tube portion 106, 108. The orthogonal gradient 690, on the other hand, comprises a temperature gradient portion perpendicular to the fluid flow. Orthogonal gradients 690 may also be referred to as transversal gradients.

One embodiment of the invention minimizes the effect that the temperature gradients 680, 690 have on the output of the thermal sensor 100. For example, in one embodiment a distance 120 between the upstream tube portion 106 and the downstream tube portion 108 is set to a length adapted to substantially cancel out the effect of the longitudinal temperature gradient 680. Substantially opposing upstream and downstream sensing elements 116, 118 create substantially similar upstream and downstream tube portions 106, 108. Similar tube portions 106, 108, combined with an appropriate distance 120 between the upstream and downstream tube portions 106, 108 serve to cancel the effect of the longitudinal gradient 680. Furthermore, placing the upstream sensing element 116 substantially opposite the downstream sensing element 118 minimizes the effect of any orthogonal gradient 690.

As shown in FIGS. 6A and 6B, the upstream sensing element 116 may comprise a first pair of sensing elements 616' and 616" and the downstream sensing element 118 may comprise a second pair of sensing elements 618' and 618". It is to be appreciated that the first and second sensing element pairs 616', 616", 618', 618" may be incorporated into the upstream and downstream sensing elements 116, 118 shown in FIG. 1. Upstream sensing elements A 616' and B 616" may be referred to as a first pair or thermal sensing elements and downstream sensing elements C 618' and D 618" may be referred to as a second pair of thermal sensing elements. The second thermal sensing elements 618', 618" may substantially oppose the first thermal sensing elements 616', 616".

In one embodiment, the distance 120 between the upstream tube portion 106 and the downstream tube portion 108 is no greater than half a length 122 of the upstream and downstream tube portions 106, 108. However, in other embodiments, the distance 120 should be as small as possible. In at least one embodiment, the distance 120 may be substantially equal to a distance between the first pair of sensing elements 616', 616" and the second pair of sensing elements 618', 618" as shown in FIGS. 6A and 6B.

As shown in FIG. 1, the length 122 of the upstream and downstream tube portions 106, 108 may comprise an upstream and downstream tube portion main sections, measured from the edge of a first temperature barrier 126 to the edge of a second temperature barrier 124. The temperature barriers 126, 124 may be comprised of a material adapted to maintain a temperature substantially equal to an ambient temperature. As such, the temperature barriers 126, 124 may be adapted to substantially maintain portions of the capillary tube 102 at the ambient temperature. In one embodiment, an upstream-tube-portion-inlet-section 128, a downstream-tube-portion-outlet-section 130 and the tube bend portion 110 may be substantially maintained at the ambient temperature. The temperature barriers 124, 126 may also be adapted to keep the capillary tube sections at a temperature other than an ambient temperature. Ensuring that a temperature of the bend portion 110 is substantially equal to the upstream-tube-portion-inlet-section 128 and the downstream-tube-portion-outlet-section 130 substantially prevents thermal siphoning in the thermal sensor 100.

The upstream and downstream tube portions 106, 108 may be substantially straight, parallel, and of substantially equal lengths 122. It is also contemplated that one or more sections of the upstream and downstream portions 106, 108 may not be substantially straight, but may be substantially parallel and symmetrical. Furthermore, it is to be appreciated that the distance 120 between the upstream and downstream tube portions 106, 108 may also refer to a distance 120 between opposing upstream and downstream sensing elements 116, 118 or element pairs 616', 616", 618', 618". In one embodiment the upstream and downstream tube portion length 122 may be from about 15 mm to about 30 mm and the distance 120 between the two portions 106, 108 may be from about 3 mm to about 10 mm.

As shown in FIG. 6A, in one embodiment, minimizing the distance 620 between the upstream and downstream tube portions 606, 608 enables a change in temperature of the upstream thermal sensing elements 616', 616" due to the longitudinal temperature gradient 680 to be substantially equal to a change in temperature of the downstream thermal sensing elements 618', 618" due to the longitudinal temperature gradient 680. The distance 120 enables substantially similar longitudinal temperature gradients 680 to affect each thermal sensing element 616', 616", 618', 618" and allows the effect of the longitudinal temperature gradient 680 to cancel out. For example, in FIG. 6A, the direction of longitudinal temperature gradient 680 is substantially similar to the fluid flow direction in the upstream tube portion 606, so the temperature of the upstream sensing element B 616" is increased by the thermal gradient 680. Along the downstream tube portion 108, the longitudinal temperature gradient 680 opposes fluid flow. Therefore, the temperature gradient 680 causes the temperature of sensor C 618' to rise. It is not necessary that the longitudinal temperature gradient 680 is constant along the tubes 106, 108. However, gradient 680 should be the same for both tube portions 106, 108, which is accomplished by minimizing the distance 120 between the tube portions 106, 108.

In one embodiment, the increase of sensor C's 618' temperature due to the longitudinal temperature gradient 680 is substantially equal to the increase in sensor B's 616" temperature. In order to cancel the effect of the longitudinal temperature gradient 680 on the sensors 616", 618', the increase in temperature in one of the sensors 616" 618' is subtracted from the increase in temperature in the other of the sensors 616" 618'. In one embodiment, the cancellation of temperatures is performed by processing voltage signals output by each sensor 616" 618'. For example, these voltages may be cancelled by a bridge circuit 542 such as, but not limited to, the bridge circuit 542 shown in FIG. 5.

Variations of the exemplary embodiment depicted in FIG. 1 may also be adapted to cancel the effects of the transversal temperature gradient 690 in a similar manner. However, unlike the longitudinal temperature gradient 680 which may fluctuate as long as the effect on the upstream and downstream tube potions 106 108 are similar, the orthogonal temperature gradient 690 should not fluctuate along the upstream and downstream tube portions 106 108. For example, temperature fluctuation of the temperature gradient 690 along the tube portions 106, 108 may cause erroneous voltage(s) to be produced by the sensors 116, 118, which may be interpreted as an inaccurate fluid flow reading.

Referring again to FIG. 6, the upstream thermal sensor 116 of FIG. 1 is represented by the upstream sensing elements A 616' and B 616" and the downstream thermal sensor 118 of FIG. 1 is represented as downstream sensing elements C 618' and D 618". A substantially constant orthogonal temperature gradient 690, will affect the upstream thermal sensing elements 616', 616" in a first manner and the downstream thermal sensing elements 618', 618" in a second manner. The thermal gradient 690 shown in FIG. 6B travels in a direction generally from the downstream tube portion 608 to the upstream tube portion 606. Therefore, the temperature of each upstream element 616', 616" will increase in substantially the same amount. Like the temperature increases in elements B 616" and C 618' due to the longitudinal temperature gradient 680 shown in FIG. 6A, in order to cancel the effect of the transversal temperature gradient 690 on elements A 616' and B 616", the thermal sensor 100 is adapted to subtract the increase in temperature in one of the elements 616' 616" with the increase in temperature in the other of the elements 616' 616". In one embodiment, the increase in voltages output by each element 616' 616" may be cancelled by a bridge circuit 542 such as, but not limited to, the bridge circuit 542 shown in FIG. 5.

Figure 2:
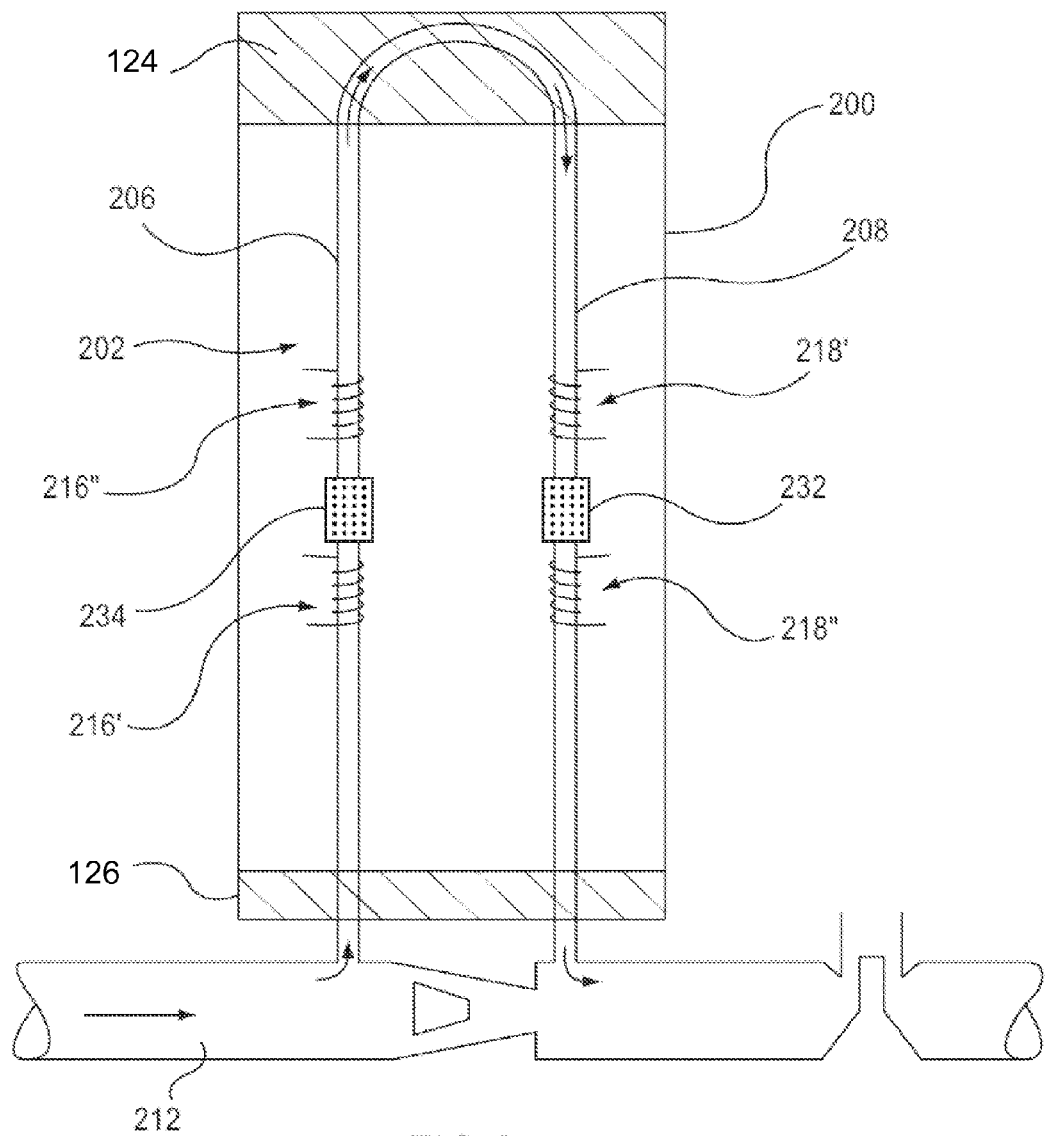
FIG. 2 is a partial view of another a mass flow controller including a thermal sensor having two pair of opposing thermal sensing elements, the thermal sensor coupled to a main flow line in accordance with an illustrative embodiment of the invention.

As shown in FIG. 2, a thermal sensor 200 may include an upstream thermal sensing element 216 which includes a first upstream resistance-thermometer element 216', an upstream heater 234, and a second upstream resistance-thermometer element 216". The downstream sensing element 118 may be comprised of a first downstream resistance-thermometer element 218', a downstream heater 232 and a second downstream resistance-thermometer sensing element 218". The upstream heater 234 may be coupled to the upstream tube portion 206 between the first and second upstream resistance-thermometer elements 216' 216" and the downstream heater 232 may be coupled to the downstream tube portion 208 between the first and second downstream resistance-thermometer elements 218', 218". In other embodiments, one or more of the sensing elements 216', 216", 218', 218" may be adapted to act as the heaters 234, 232. The heaters/elements may be adapted to heat the fluid flowing through the capillary tube 202. In yet another embodiment, the heaters 232, 234 may not be heaters but may comprise cooling devices. In such an embodiment, the thermal sensor 100 may operate in substantially the same manner as a thermal sensor 100 adapted to heat the fluid flowing through the capillary tube 202 and therefore output varying sensing element 216', 216", 218', 218" voltages proportional to the increase in sensing element 216', 216", 218', 218" temperature. However, in using a cooling device instead of a heater 232, 234, the fluid may be cooled and the sensing element 216', 216", 218', 218" voltages may be generally proportional to the decrease in sensing element 216', 216", 218', 218" temperature.

Figure 3:
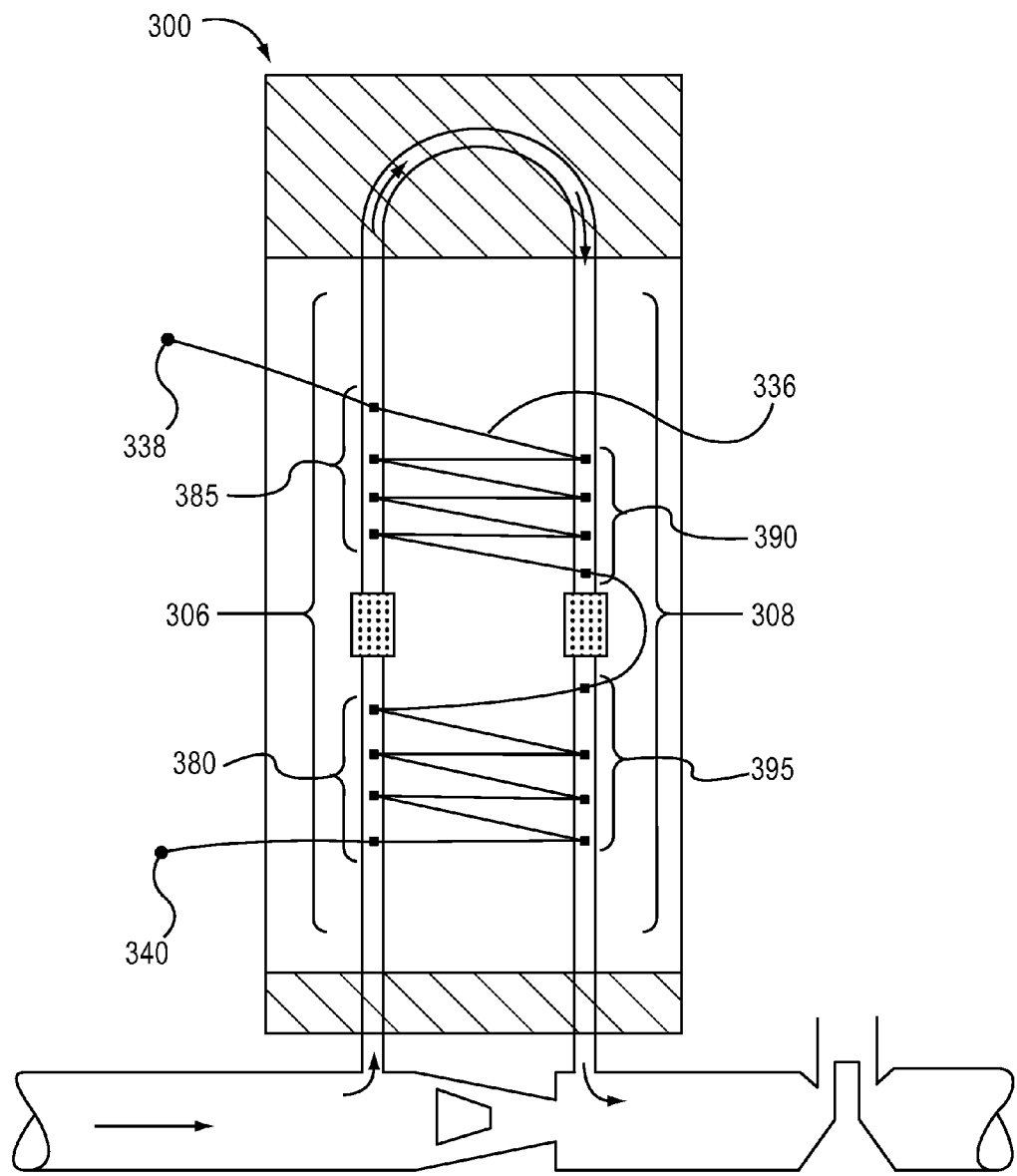
FIG. 3 is a partial view of yet another mass flow controller including a thermal sensor having a thermopile sensing element, the thermal sensor coupled to a main flow line in accordance with an illustrative embodiment of the invention.

As further shown in FIG. 3, the upstream and downstream sensors 116, 118 may be comprised of a thermopile sensor 336. The thermopile sensor 336 may be comprised of a first output 338 and a second output 340. Unlike the thermal sensor 100 as shown in FIGS. 1 and 2 however, one thermopile sensor 336 may be adapted to produce a signal which is adjusted for the increase and decrease in temperature due to longitudinal and orthogonal temperature gradients 680, 690. This adjustment is performed by the principle of thermocouple measurements known in the art. Therefore, the signals at the sensor outputs 338, 340 may be directly used to determine the actual fluid flow rate.

In one embodiment, the number of locations where the thermopile sensor 336 couples to the upstream tube portion 306 is equal to the number of locations where the thermopile sensor 336 couples to the downstream tube portion 308. Furthermore, the number of locations where the thermopile sensor 336 couples to a first upstream quadrant 380 is equal to the number of locations where the thermopile sensor 336 couples to the second downstream quadrant 395 and the number of locations where the thermopile sensor 336 couples to the first downstream quadrant 390 is equal to the number of location where the thermopile sensor 336 couples to the second upstream quadrant 385. In one embodiment, the thermopile sensor 336 may couple to all four quadrants 380, 385, 390, 395 in the same number of locations. Additionally, the thermopile sensor 336 may couple to the first upstream quadrant 380 and the first downstream quadrant 390 at "hot" coupling locations and the thermopile sensor 336 may couple to the second upstream quadrant 385 and second downstream quadrant 395 at "cold" coupling locations.

Figure 5:
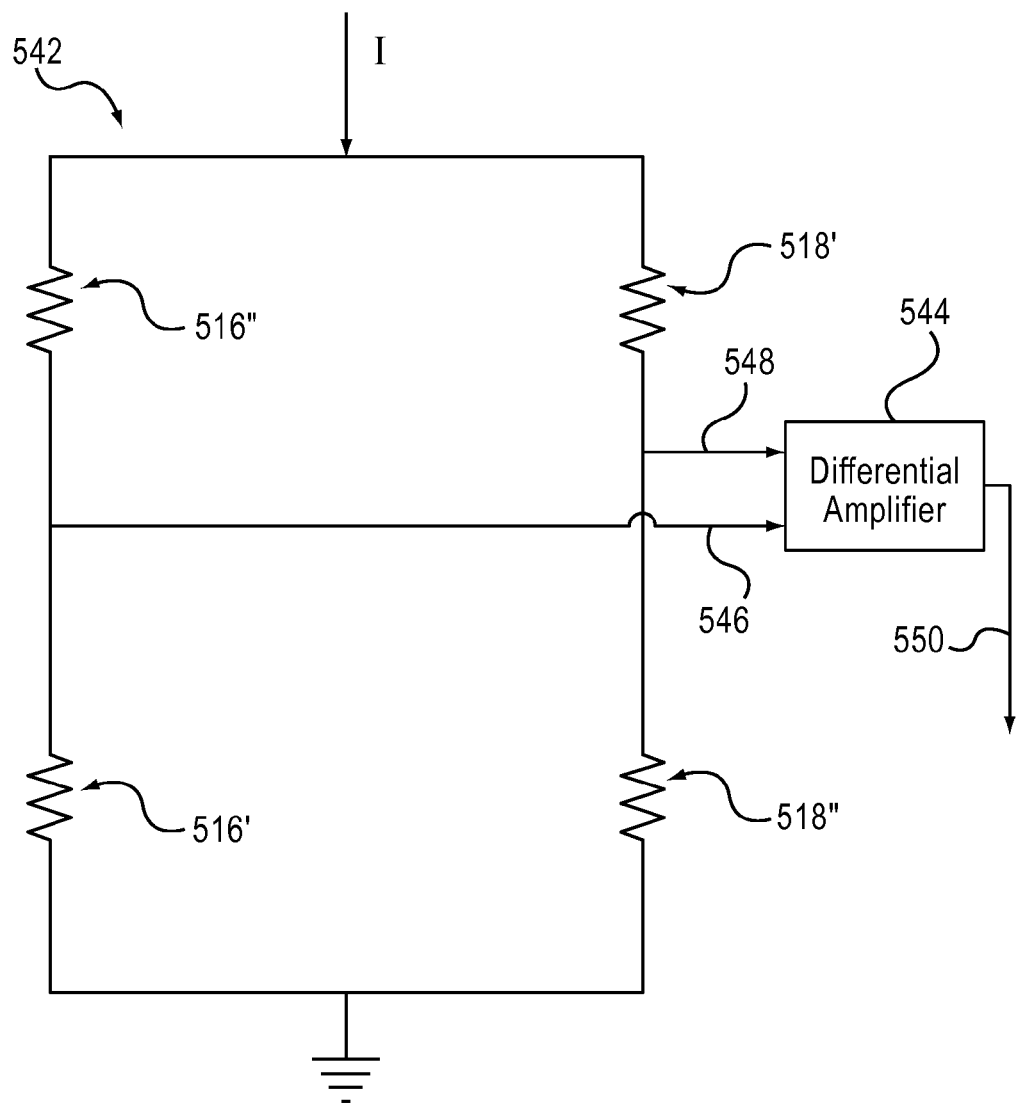
FIG. 5 is schematic representation of a mass flow controller bridge circuit in accordance with an illustrative embodiment of the invention.

As shown in FIG. 5, when an embodiment uses a bridge 542, the bridge may send one or more signals 546, 548 to a differential amplifier 544. The bridge 542 may be adapted to act as the well-known Wheatstone bridge. In one embodiment, the differential amplifier 544 may be adapted to modify the one or more signals 546, 548, outputting a differential amplifier signal 550 whose voltage is substantially proportional to the fluid flow.

Figure 4:
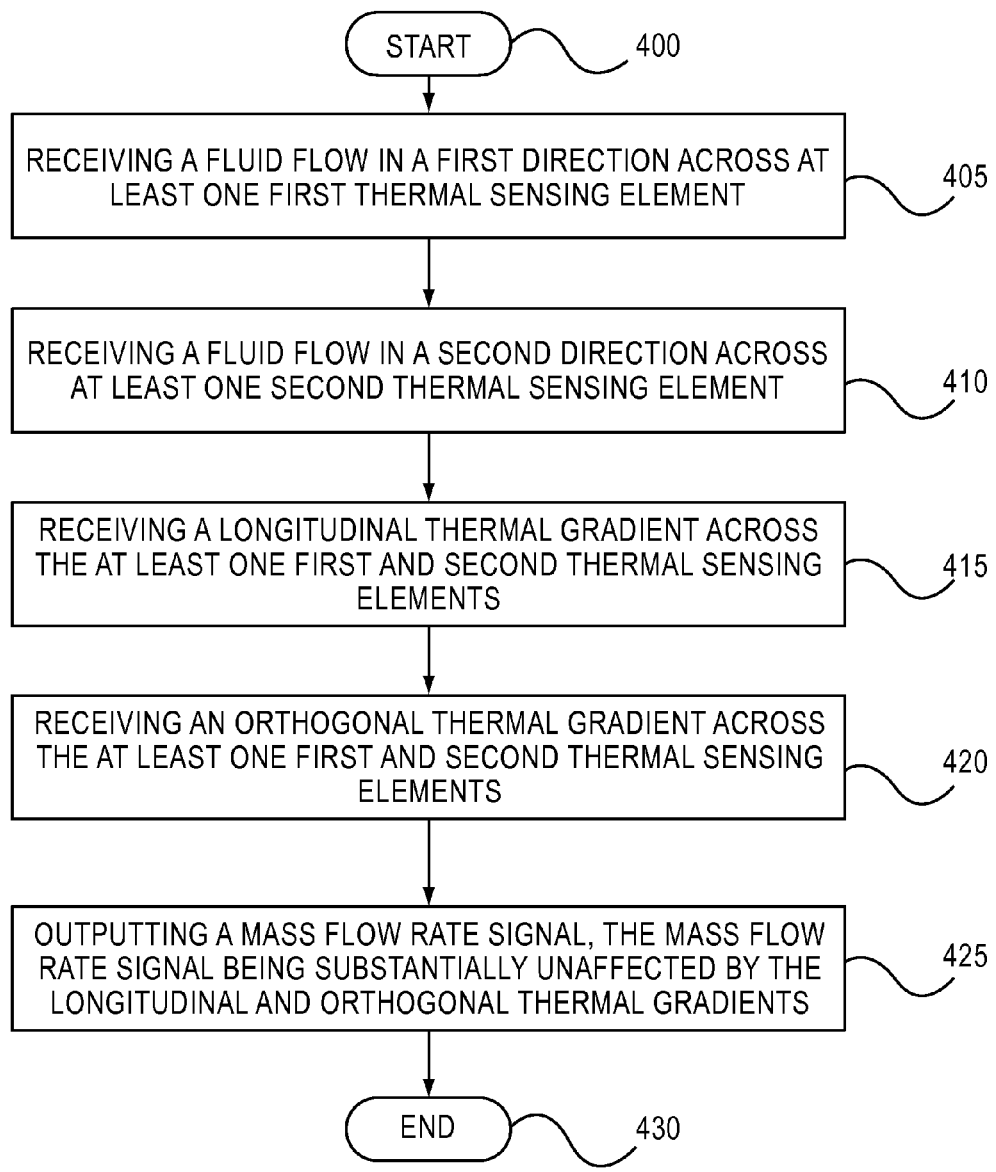
FIG. 4 is a flowchart of a method of operating a mass flow controller thermal sensor in accordance with an illustrative embodiment of the invention.

Beginning at 400 in FIG. 4, a method of operating a mass flow controller thermal sensor 100 is shown. At 405, one method is comprised of receiving a fluid flowing in a first direction across at least one first thermal sensing element. For example, as shown in FIG. 1, a fluid may flow from the main flow line 112 into the upstream portion 106 of the capillary tube 102, towards the tube bend portion 110, traveling across the upstream thermal sensing element 116 coupled to the upstream tube portion 106. Likewise, at 410, a fluid is received in a second direction across at least one second thermal sensing element, which may be accomplished by a fluid flowing from the tube bend portion 110, through the downstream tube portion 108, across the downstream sensing element 118 coupled to the downstream tube portion 108, and to the main flow line 112.

At 415 and 420 of FIG. 4, temperature gradients such as the longitudinal and orthogonal thermal gradients 680, 690 of FIGS. 6A and 6B, respectively, may be induced across at least one first and second thermal sensing elements by an external thermal source. For example, the gradients 680, 690 may travel across the upstream and downstream elements 116, 118 in FIG. 1. Furthermore, at 425, a mass flow rate signal may be output by the thermal sensor 100, the mass flow rate signal (not shown in FIG. 1) comprising a voltage generally proportional to the mass flow rate of a fluid flowing through the MFC. One mass flow rate signal may be obtained by utilizing voltages output by the thermal sensing elements 116, 118. The thermal sensing elements' 116, 118 output voltages may be generally proportional to the temperature of the element 116, 118. In one embodiment comprising the first pair of sensing elements 616', 616" and second pair of sensing elements 618', 618", the voltage of each element 616', 616", 618', 618" is substantially proportional to the temperature of each element. One mass flow rate signal output by the thermal sensor 100 is unaffected by the longitudinal and orthogonal temperature gradients 680, 690. The method ends at 430.

In one method, the mass flow rate output signal is unaffected by the longitudinal temperature gradient 680 because the change in temperature that the gradient 680 has on at least one portion of one of the sensing elements 116, 118 is cancelled by the change in temperature that the gradient 680 has on at least one portion of the other of the sensing elements 116, 118. In one method, the change in temperature of at least a portion of each sensing element 116, 118 may be substantially equal due to the distance 120 being no greater than half the length 122 of the upstream or downstream tube portions 106, 108.

In another method, the first and second thermal sensing elements 116, 118 comprise upstream and downstream thermal sensing element pairs 616', 616", 618', and 618", as shown in FIG. 6B. The orthogonal thermal gradient 690 induces a differential temperature amplitude between the first upstream thermal sensing element 616' and the second downstream thermal sensing element 618". In one method, the differential temperature amplitude comprises an increase in temperature of the first upstream thermal sensing element 616' as compared to the second downstream thermal sensing element 618". Similarly, the orthogonal thermal gradient 690 induces a differential temperature amplitude between the second upstream thermal sensing element 616" and the first downstream thermal sensing element 618'. This differential temperature amplitude may comprise an increase in temperature of the second upstream thermal sensing element 616" as compared to the first downstream thermal sensing element 618'.

In one method, the thermal sensor 100 is adapted to cancel the change in temperature in the first upstream thermal elements 616' with the change in temperature in the second upstream thermal sensing element 616". To do so, the change in the first upstream thermal element 616' temperature may be subtracted from the change in the second downstream thermal element 618" temperature to obtain a first orthogonal gradient temperature change. Also, the change in the first downstream sensing element 618' temperature may be subtracted from the change in the second upstream thermal sensing element 616" temperature to create a second orthogonal gradient temperature change. Therefore, the second orthogonal temperature change is of substantially equal absolute value, but with a different sign, as compared to the first orthogonal gradient temperature change. As a result, combining the two orthogonal temperature changes creates an essentially negligible temperature change as the value of the two orthogonal gradient temperature changes cancel each other out.

Combining the changes in temperature as described above may be performed by combining the signal of each sensor 616', 616", 618', 618" outputs. Such combination of signals may be performed by a circuit bridge and performing signal modification. For example, bridge 542 and differential amplifier 544 as shown in FIG. 5 may be used. To do so, a first and second signals 546, 548 may be generated by the bridge circuit 542 from the voltages produced by the thermal sensing elements 516', 516", 518', 518". The signals 546, 548 may be received by the differential amplifier 544, and the amplifier 544 may then generate a differential amplifier signal 550 having a voltage generally proportional to the flow rate of the fluid through the MFC.

Figure 7:
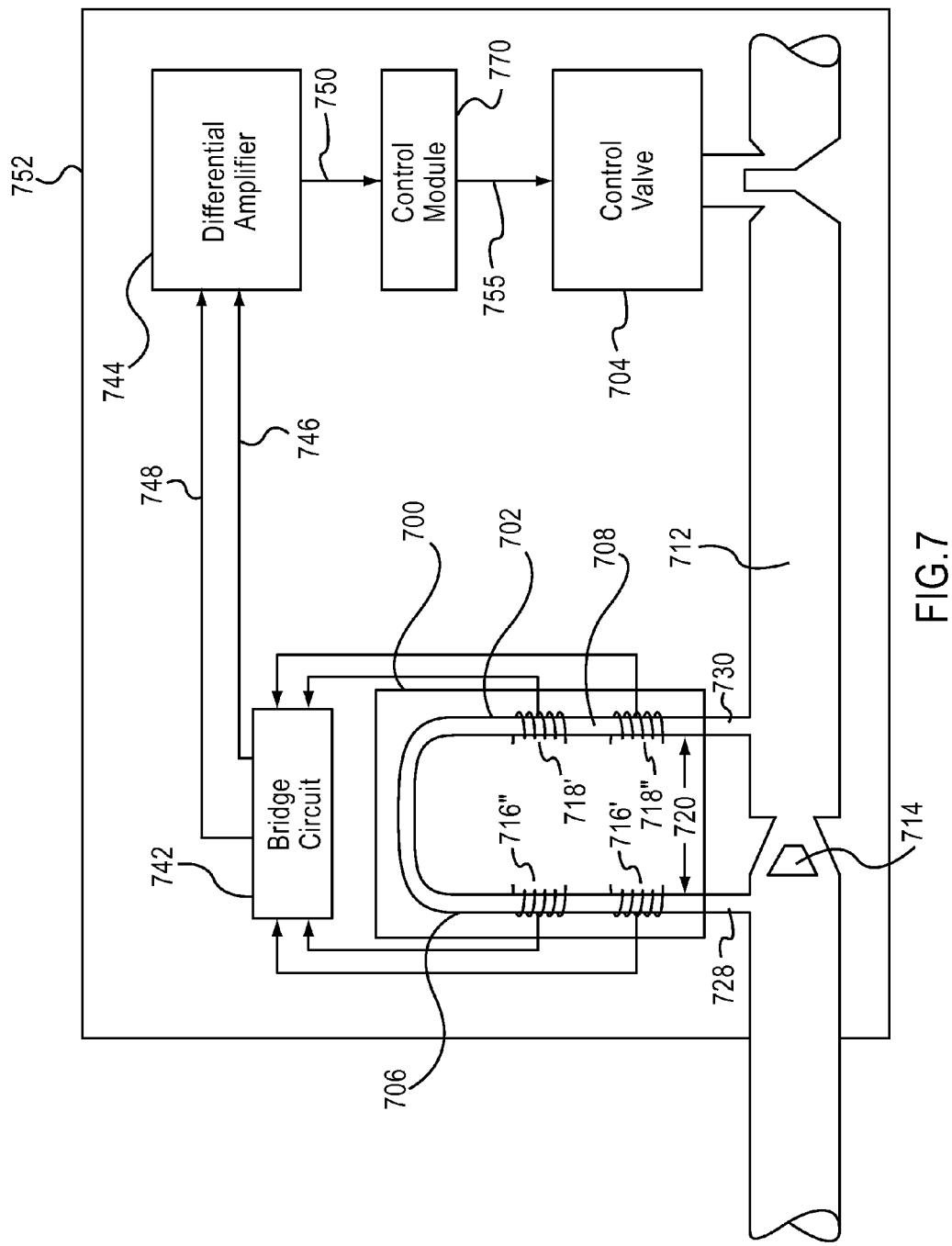
FIG. 7 is a schematic representation of an MFC in accordance with an illustrative embodiment of the invention.

FIG. 7 shows yet another embodiment of the invention. FIG. 7 is a representation of a mass flow controller 752 comprising a main flow line 712, a thermal sensor 700 and a differential amplifier 744. The MFC 752 may also comprise a bridge circuit 742, which comprises sensing elements 716', 716", 718', 718", and a control module 770. The control module may be adapted to produce a control valve signal 755. In one embodiment, the thermal sensor 700 is comprised of a capillary tube 702 having a u-shaped cross-section. The capillary tube 702 may be comprised of an upstream tube portion 706 coupled to the main flow line 712 and a substantially parallel downstream tube portion 708 coupled to the main flow line 712. The downstream tube portion 708 is situated a first distance 720 from the upstream tube portion 706, Distance 720 is a distance between upstream and downstream portions 706, 708 of the capillary tube 702 inside the thermal sensor 700. A distance between upstream-tube-portion-inlet-section 128 and a downstream-tube-portion-outlet-section 130 may be substantially different than the distance 720. The first distance 720 in one embodiment also enables a differential amplifier signal 750 to be substantially unaffected by the longitudinal temperature gradient 680 shown in FIG. 6B.

Additionally, the MFC 752 is comprised of at least one sensing element coupled to the capillary tube 702. The at least one sensing element may be comprised of an upstream sensing element pair 716', 716" and a downstream sensing element pair 718', 718" generally opposing the upstream sensing element pair 716', 716". Each element may produce a signal adapted to be received by the bridge circuit 742, and the bridge circuit may be adapted to output a pair of signals 746, 748 adapted to be received by the differential amplifier 744. In another embodiment, the MFC 752 may be comprised of a thermopile sensor 336 as shown in FIG. 3, or a pair of generally opposing heaters 232, 234, as shown in FIG. 2, the heaters coupled to the upstream and downstream tube portions 706 708, respectively.

One embodiment of a MFC 752 may also include a differential amplifier 744 adapted to output the differential amplifier signal 750. In one embodiment, the differential amplifier signal 750 comprises a voltage generally proportional to a flow rate of the fluid flowing through the mass flow controller 752. Furthermore, the differential amplifier signal 752 is not substantially affected by orthogonal and longitudinal temperature gradients 680, 690, as shown in FIGS. 6A and 6B.

In many variations of the MFC 752, a first change in temperature in at least one of the thermal sensing elements 116, 118 as caused by the orthogonal temperature gradient 690 as shown in FIG. 6B may be cancelled by a second change in temperature of the other of the thermal sensing elements 116, 118. It is to be appreciated that the thermal sensing elements 116, 118 may be comprised of the elements A, B, C, and D 616', 616", 618', 618" as shown in FIG. 6B. Furthermore, based on the ability of the MFC 752 to cancel the change in temperature caused by an orthogonal temperature gradient 690, the differential amplifier signal 750 is unaffected by the orthogonal temperature gradient 690.

What is claimed is:

1. A mass flow controller thermal sensor comprising:
a capillary tube having an upstream tube portion, a tube bend portion, and a downstream tube portion, wherein,
the upstream tube portion comprises an upstream portion length,
the downstream tube portion comprises a downstream portion length, the downstream portion length is substantially equal to the upstream portion length and the downstream tube portion is substantially parallel to the upstream tube portion,
a first pair of thermal sensing elements coupled to the upstream tube portion, the first pair of thermal sensing elements including a first upstream element and a first downstream element;
a second pair of thermal sensing elements coupled to the downstream tube portion, the second pair of thermal sensing elements including a second upstream element and a second downstream element the second pair of sensing elements generally opposing the first pair of sensing elements;
a thermally conductive element coupled to the capillary tube at a location between the first downstream element and the second upstream element, and the thermally conductive component is disposed to thermally couple the capillary tube to an ambient temperature; and
the first and second pairs of thermal sensing elements being coupled to form a bridge that includes a top node, a right node, a bottom node, and a left node, and the first upstream element is coupled between the left and bottom nodes, the first downstream element is coupled between the left and top nodes, the second upstream element is coupled between the top and right nodes, and the second downstream element is coupled between the right and bottom nodes.

2. The mass flow controller thermal sensor of claim 1 wherein,
the upstream tube portion is (i) coupled to a first end of the tube bend portion, and (ii) adapted to receive a gas flow in a first direction; and
the downstream tube portion is (i) coupled to a second end of the tube bend portion and (ii) adapted to receive a gas flow in a second direction, the second direction generally opposing the first direction; and
the capillary tube generally comprises a U shape.

3. The mass flow controller thermal sensor of claim 1 wherein,
the upstream tube portion further comprises an inlet section and an upstream tube portion main section;
the downstream tube portion further comprises an outlet section and a downstream tube portion main section;
the tube bend portion, the inlet section and the outlet section are thermally coupled to the ambient temperature so as to render temperatures of the tube bend portion, the inlet section and the outlet section substantially the same.

4. The mass flow controller thermal sensor of claim 1 further comprising,
a first heater, the first heater being coupled to the upstream tube portion between the first pair of sensing elements; and
a second heater, the second heater coupled to the downstream tube portion between the second pair of sensing elements and generally opposing the first heater.

5. The mass flow controller thermal sensor of claim 1 further comprising, a differential amplifier, wherein the differential amplifier is coupled to the left and right, and the differential amplifier is configured to output a differential amplifier signal, the differential amplifier signal comprising a voltage generally proportional to a flow rate of fluid flowing through the capillary tube.

6. The mass flow controller thermal sensor of claim 5 wherein, the differential amplifier signal output by the differential amplifier is substantially unaffected by an orthogonal and longitudinal temperature gradients across the sensing elements.

7. A method of operating a mass flow controller comprising,
receiving a flow of fluid in a first direction across at least a first pair of thermal sensing elements including a first upstream element and a first downstream element, the first downstream element being downstream from the first upstream element;
receiving a flow of fluid in a second direction across at least a second pair of thermal sensing elements including a second upstream element and a second downstream element, the second downstream element being downstream from the second upstream element;
thermally coupling the fluid at a location between the first downstream element and the second upstream element to an ambient environment; and
subtracting a sum of signals from the first upstream and the second upstream elements from the sum of signals from the first downstream and the second downstream elements to generate a mass flow rate signal, the mass flow rate signal being substantially unaffected by longitudinal and orthogonal thermal gradients.

8. A mass flow controller comprising,
a main flow line;
a thermal sensor including,
a capillary tube having a u-shaped cross-section, the capillary tube comprising an upstream tube portion coupled to the main flow line and a substantially parallel downstream tube portion coupled to the main flow line, wherein, the downstream tube portion is situated a first distance from the upstream tube portion, the first distance enabling a laminar flow of fluid through the capillary tube and main flow line,
a first pair of sensing elements coupled to the upstream tube portion, the first pair of sensing elements including a first upstream element and a first downstream element;
a second pair of sensing elements coupled to the downstream tube portion, the second pair of sensing elements including a second upstream element and a second downstream element;
a thermally conductive element disposed to set a temperature of at least a portion of the mass flow controller capillary tube between the first downstream element and the second upstream element about equal to an ambient temperature; and
processing means for generating an output signal by subtracting a sum of signals from the first upstream element and the second upstream element from a sum of signals from the first downstream and the second downstream elements.

9. The mass flow controller of claim 8 wherein, the first and second pairs of sensing elements include a thermopile sensor.

10. The mass flow controller of claim 8 wherein, the first distance further enables the output signal to be unaffected by a longitudinal temperature gradient.

11. The mass flow controller of claim 8 further including:

a first heater coupled to the upstream tube portion between the first upstream element and the first downstream element; and a second heater coupled to the downstream tube portion between the second upstream element and the second downstream element.

\* \* \* \* \*